2 Sheets--Sheet 1.

H. WATERS.

Improvement in the Manufacture of Bayonets and in Apparatus therefor.

No. 4,394. Reissued May 23, 1871.

Witnesses.
Mc. W. Frothingham.
C. Warren Brown.

Hervey Waters,
By his Attys.
Crosby & Gould.

AM. PHOTO-LITHOGRAPHIC CO. N.Y. (OSBORNE'S PROCESS.)

H. WATERS. 2 Sheets--Sheet 2.

Improvement in the Manufacture of Bayonets and in Apparatus therefor.

No. 4,394. Reissued May 23, 1871.

Witnesses. { M. W. Frothingham. C. Warren Brown

Hervey Waters. By his Attys. Crosby & Gould.

AM. PHOTO-LITHOGRAPHIC CO. N.Y. (OSBORNE'S PROCESS.)

UNITED STATES PATENT OFFICE.

HERVEY WATERS, OF BOSTON, MASSACHUSETTS.

IMPROVEMENT IN THE MANUFACTURE OF BAYONETS AND IN APPARATUS THEREFOR.

Specification forming part of Letters Patent No. 47,590, dated May 2, 1865; Reissue No. 4,394, dated May 23, 1871.

*To all whom it may concern:*

Be it known that I, HERVEY WATERS, of Boston, in the State of Massachusetts, (formerly of Northbridge, in said State,) have invented certain Improvements in the Manufacture of Bayonets and in Apparatus Therefor, of which the following is a specification.

One of said improvements consists in a new process or method of procedure in forging bayonets, and another of the improvements consists in a peculiar system or suit of drawing and shaping grooves (modeled in a pair of rolls) for rolling or drawing the blades in practicing my new method of forging bayonets.

United States Letters Patent No. 43,247, dated June 21, 1864, were granted to me for an "improved bayonet-blank," to which patent I refer for a description of said blank and for the manner of producing the same in the manufacture of bayonets, which description, as far as it goes, I hereby make a part of the description of my said new process, and, in addition thereunto, I shall proceed further to describe the same by next describing my drawing and shaping rollers and the manner of using them.

Figure 2:
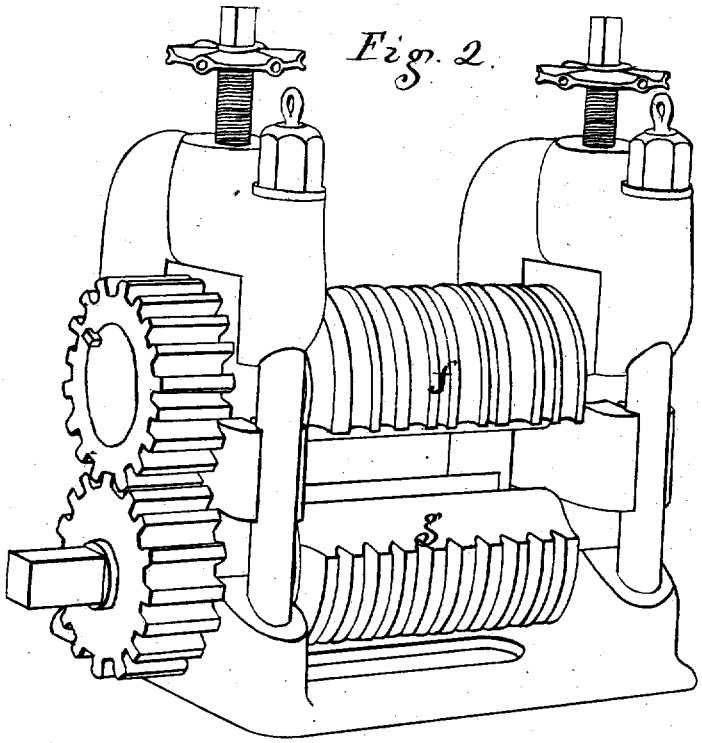

These rollers are herein represented at *f g*, Figure 2, in the full surfaces of which my peculiar system of grooves may be modeled in any suitable manner.

The grooves of the system have terminations, which are concentric, or nearly so, toward their small ends, which is found to be much more simple and practical than when the taper holds throughout the length of the working grooves. Of course the finishing-passes will always have eccentric grooves throughout, if the work calls for it; but for the purposes of the most rapid drawing the concentric terminations are preferable.

Figure 1:
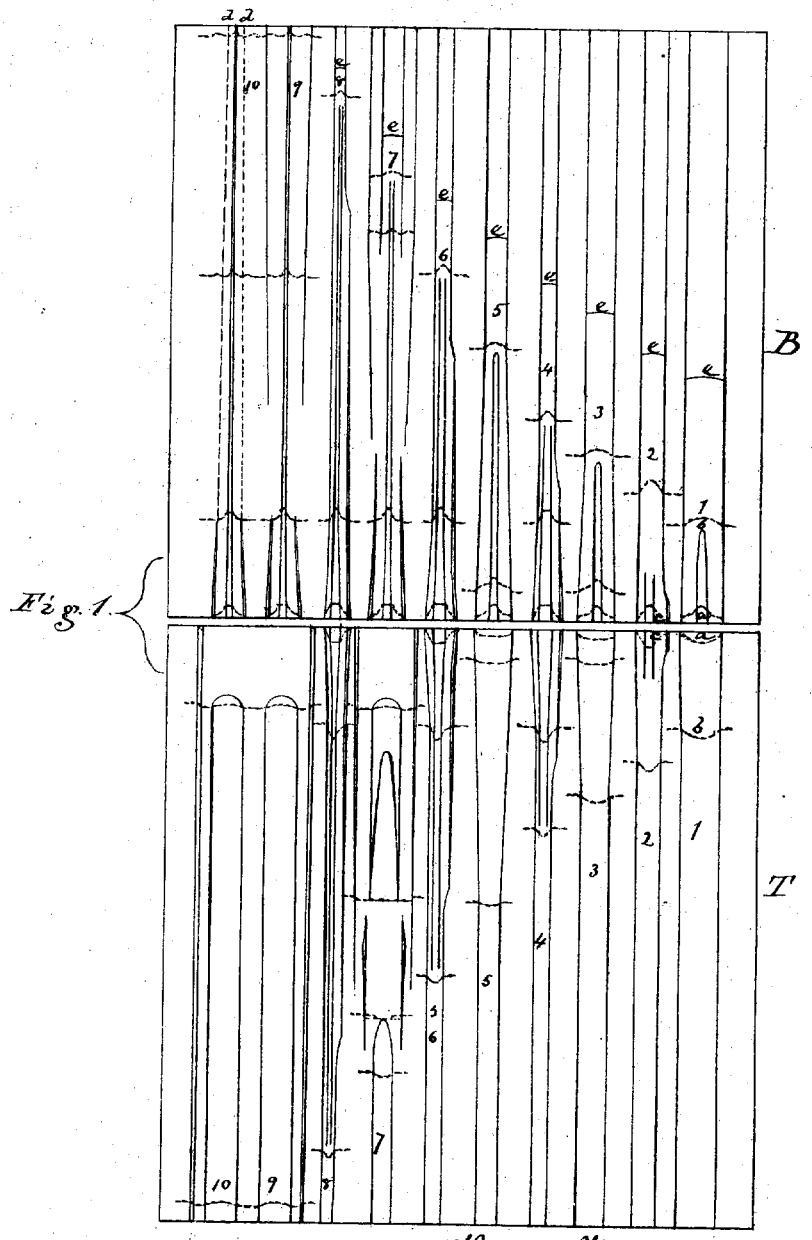

For a better understanding of this system of grooves reference may be had to Fig. 1 of the drawings which represents the cylindrical working surfaces of the two rolls reduced to a horizontal plane.

B represents the bottom roll, and T the top roll, the figures 1 1 denoting the two grooves working in conjunction for the first pass, figures 2 2 the grooves for the second pass, and so on up to the figures 9 9, which represent the finishing-pass for forming a bayonet-blade. 10 10 show another finishing-pass for the same purposes as 9 9, to be used in some cases, as will be hereinafter explained.

The dotted lines at *a a* in the first pass show in section respectively the form and depth of the groove from the surface of the roll at the heel of the pass when the work is first seized by the rolls, and at *b b* is represented by dotted lines the forms, in section, of the grooves at about the point indicated, and which they hold to the end of the groove. *c c* show respectively a section of the second pass, and so on through the series, the dotted lines everywhere indicating sectional forms of the grooves at about the points where such lines are located, but in the tenth groove of the bottom roll the dotted lines *d d* represent the outlines of the edges of a bayonet-blade. The full lines *e e*, &c., represent the points to about which a blank would reach when drawn in this system of grooves in its progress from groove to groove, and it will be observed that in all cases the points reach beyond the dotted lines, where the grooves are always concentric, the concentric termination getting shorter and shorter as the work progresses, while the approximate form gets longer and longer, so that at the same time that that part toward the point is being rapidly reduced in size the other part is being perfected in form, the finished form running the entire length of the blade in the finishing-pass 9 9.

As a matter of economy it is found useful to use two finishing-passes in a suit of grooves for rolling bayonet-blades, it being desirable to give a more perfect finish at the last pass than at the preparatory passes of the work. When the grooves are new the blade is finished entirely at the ninth pass of this system of grooves, but as this pass becomes rough from use the work is finished in the tenth groove, going from the eighth groove to the tenth groove, skipping over the ninth groove.

For presenting the piece to the action of the rolls tongs may be used, the operator placing the piece directly in the grooves of the lower roll and gaging directly from the forward corner of the same roll, as heretofore practiced, taking care to have the tongs fit well upon the neck of the blank and to lay the nose of the tongs fair against the forward face of the roll, so as to insure the proper relation of the work done by the several passes to the neck in the tongs, and also the proper relation of the work of each successive pass to the work of the one that preceded it until the blade is drawn out in proper relation to the shank, as described in the Patent No. 43,247, before referred to, and therein represented at Fig. 2.

When the blade with its neck has been thus produced, the addition of the socket, so as to complete the formed bayonet, is accomplished in the usual manner, taking care, however, to have the tools to fit properly to the parts in working, so as to insure the proper relation of the socket to the neck and blade of the bayonet.

When the bayonet is thus produced in a forged state, the socket and neck may be annealed and finished in the usual manner, but the blade may be and is finished by simply correcting its two side edges and then tempering, straightening, and smoothing the whole of it instead of being obliged to anneal blade and all, as heretofore, and then, as heretofore, milling all three edges and all three concave sides of the blade before tempering, straightening, and smoothing the same.

I claim—

1. The improvement in the manufacture of bayonets, substantially as described.

2. A system of grooves for drawing and shaping, substantially as and for the purpose specified.

HERVEY WATERS.

Witnesses:

M. W. FROTHINGHAM,

FRANCIS GOULD.